May 28, 1963  D. S. MONITOR  3,091,434
FAIRED CABLE DRIVE SYSTEM
Filed Sept. 11, 1961  7 Sheets-Sheet 1

INVENTOR
DEAN S. MONITOR

BY
ATTORNEY

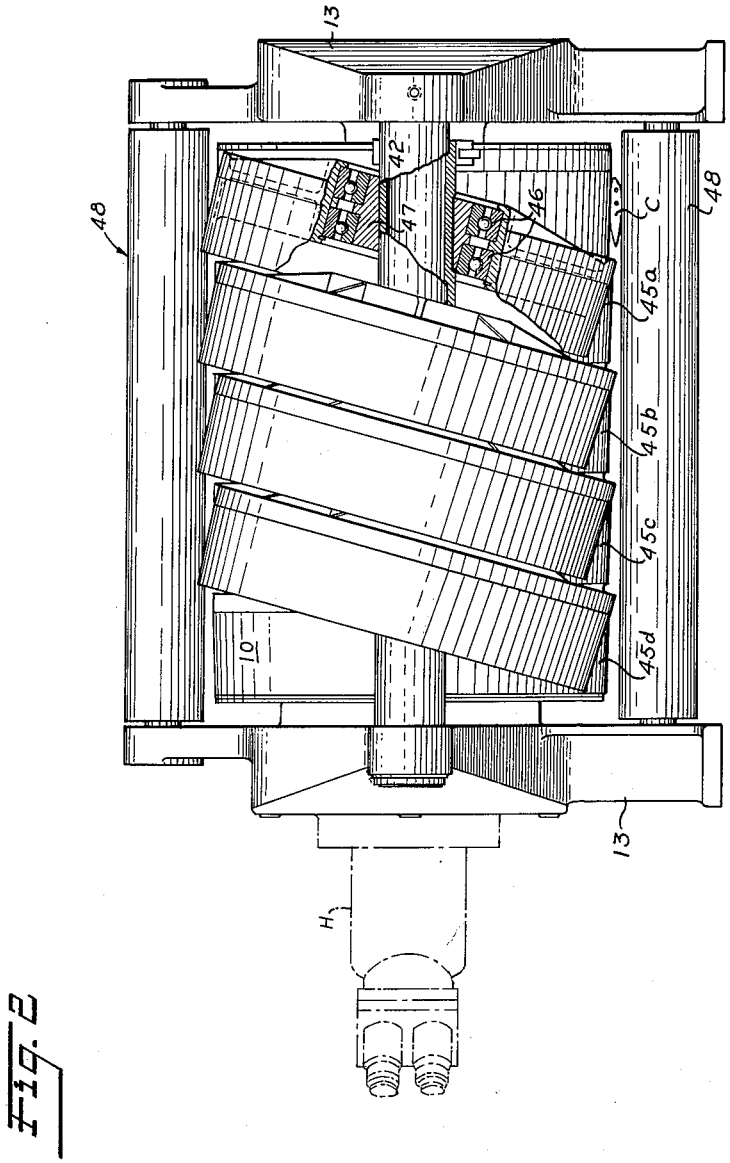

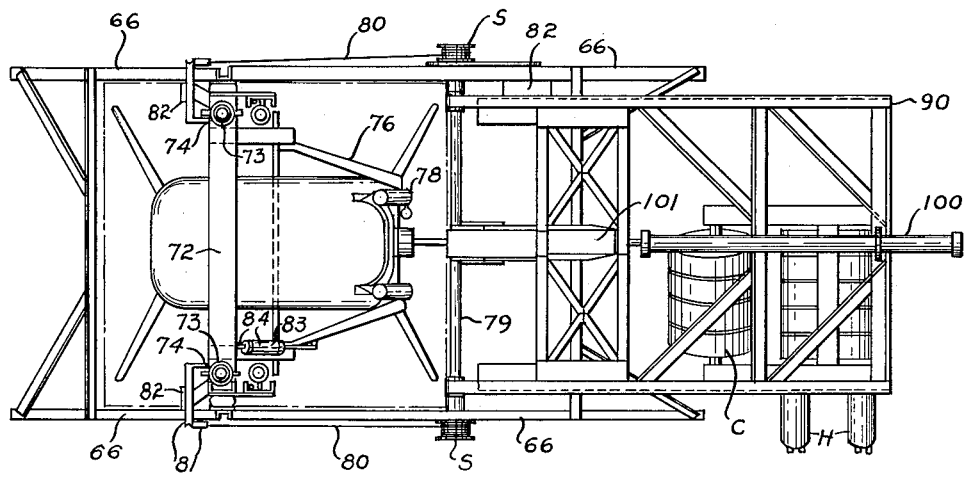
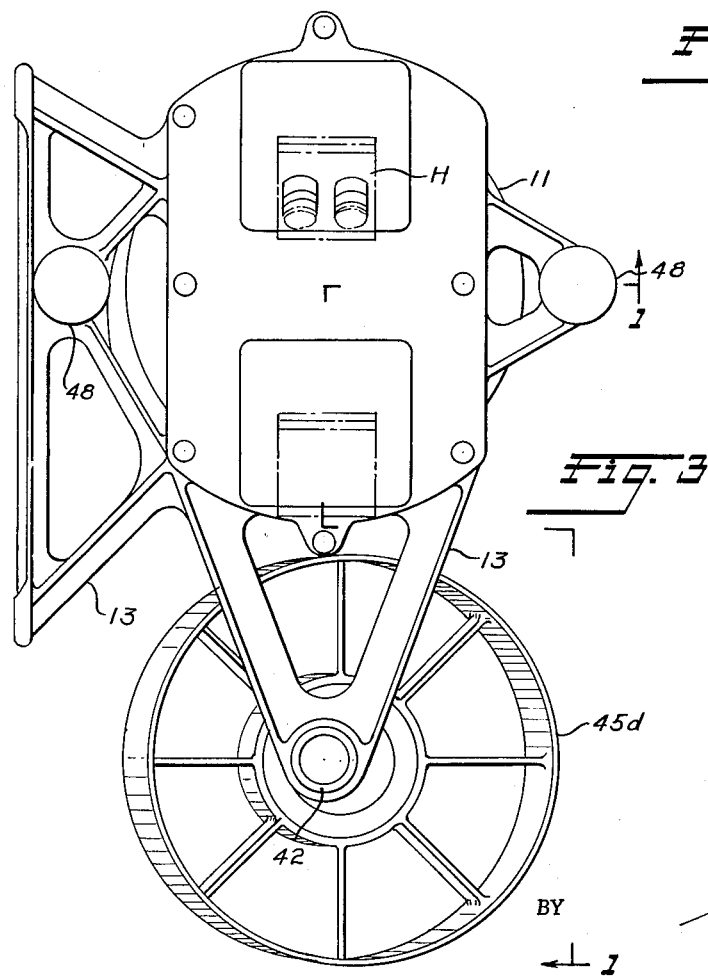

INVENTOR
DEAN S. MONITOR

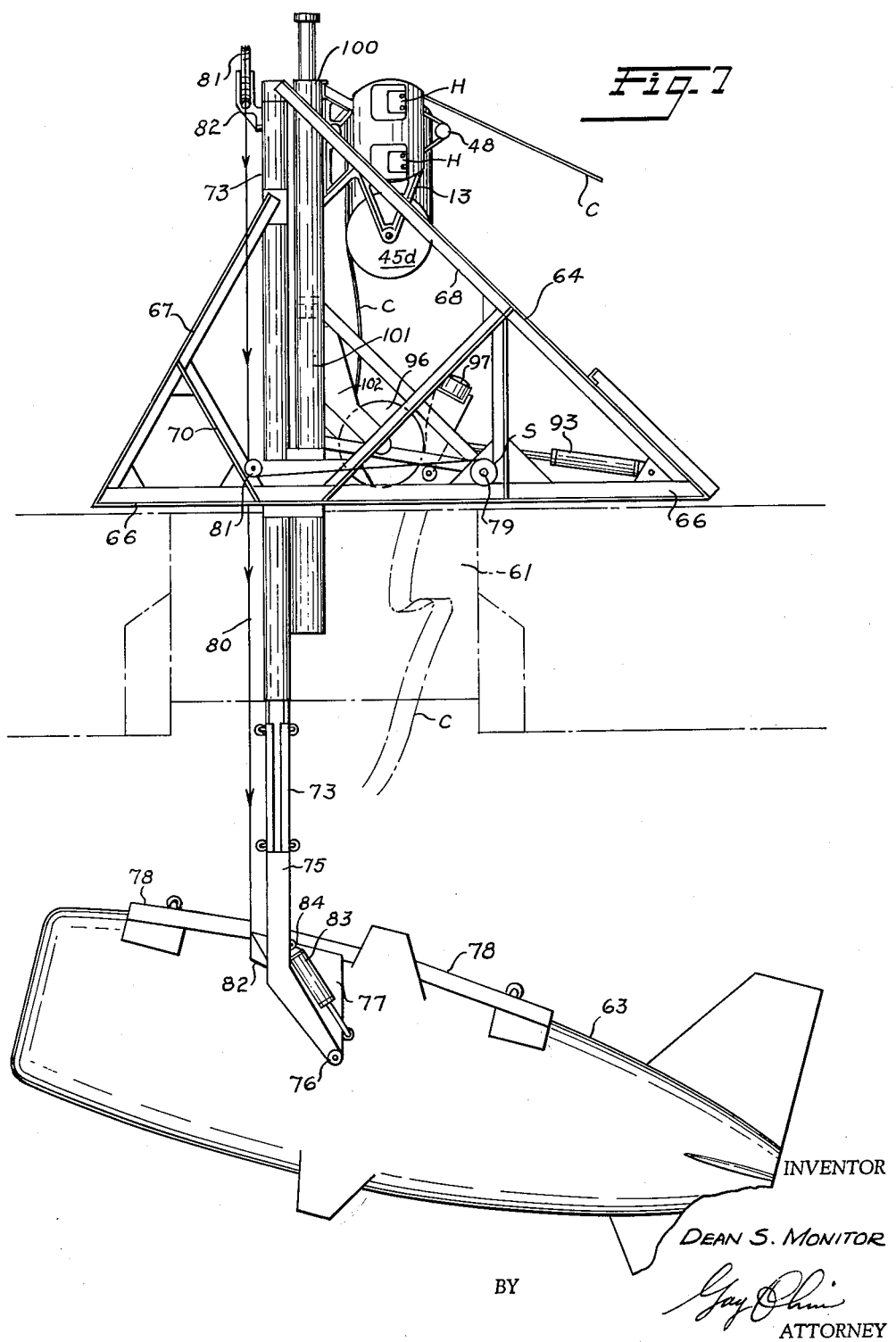

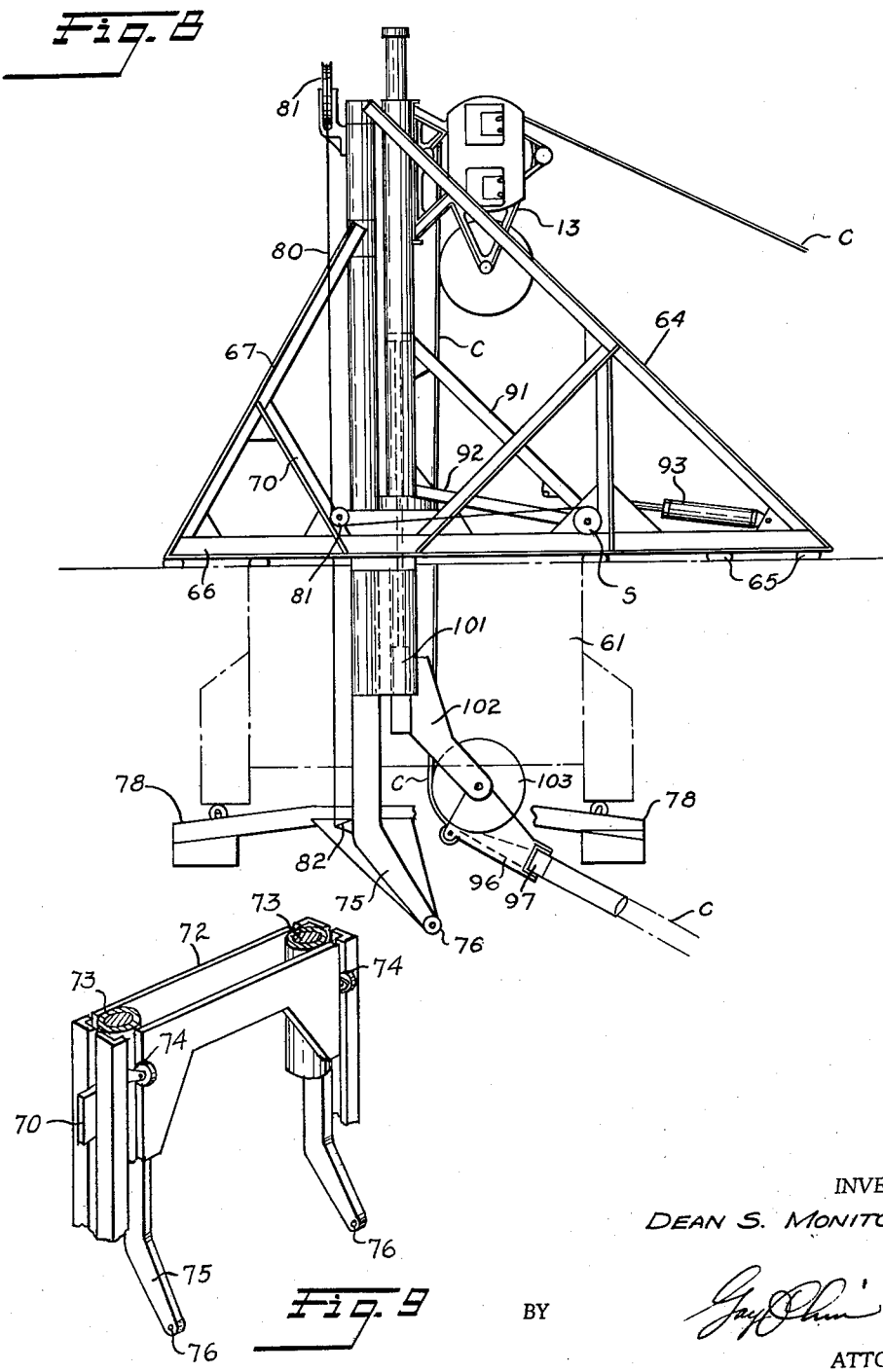

3,091,434
FAIRED CABLE DRIVE SYSTEM
Dean S. Monitor, Timonium, Md., assignor to Martin-Marietta Corporation, a corporation of Maryland
Filed Sept. 11, 1961, Ser. No. 137,119
9 Claims. (Cl. 254—175.5)

This invention relates to an apparatus for reeling, handling and storing long lengths of cable, and more particularly, to faired cable which is sensible to crushing and abuse.

The principal object of the invention is to provide an organization of elements capable of handling a greater proportion of faired cable than heretofore possible with present equipment.

A further object of the invention is the provision of a power driven cable drum and its associated idler pulleys which serve to control and direct the cable from one area on the periphery of the drum to an adjacent area repeatedly to effect the total angle of wrap required to achieve a desired ratio of cable tension.

A still further object of the invention is to correlate the angled position of the idler pulleys relative to the cable drum so that the cable is directed into parallel planes perpendicular to the axis of the drum when the cable is being transferred between the drum and the idler control pulleys.

A typical installation of this mechanism is shown in the drawings wherein an aircraft is provided with an opening in the bottom wall of the fuselage and above which, on the floor level of the craft, is positioned a structure for storing a sonar buoy. The apparatus includes a cradle and lifting and lowering mechanism for handling the sonar buoy, and the hoisting apparatus together therewith advances and retracts, under control of an operator, the cable for lowering the sonar buoy down into the water to conduct appropriate soundings for locating submerged objects.

The details of the invention, as well as additional objects and advantages, will be clearly understood with reference to a preferred embodiment illustrated in the accompanying drawings employing similar reference numbers to identify the same elements in each of the several views, and in which:

FIG. 2 is a bottom plan view of the idler control pulleys with one pulley being shown in section;

FIG. 3 is a side elevation showing the assembly of the cable drum and idler control pulleys;

FIG. 5 is a top plan view of the assembly as shown in FIGS. 4 and 6;

FIG. 7 is an operational view with the sonar buoy being lowered preparatory to launching into restrained flight;

FIG. 8 is another operational view with the cradle retracted and the cable control mechanism retaining the sonar buoy during the towing operation; and FIG. 9 is a perspective view of the means which straddles the sonar buoy for raising and lowering the same relative to the aircraft.

Figure 1:
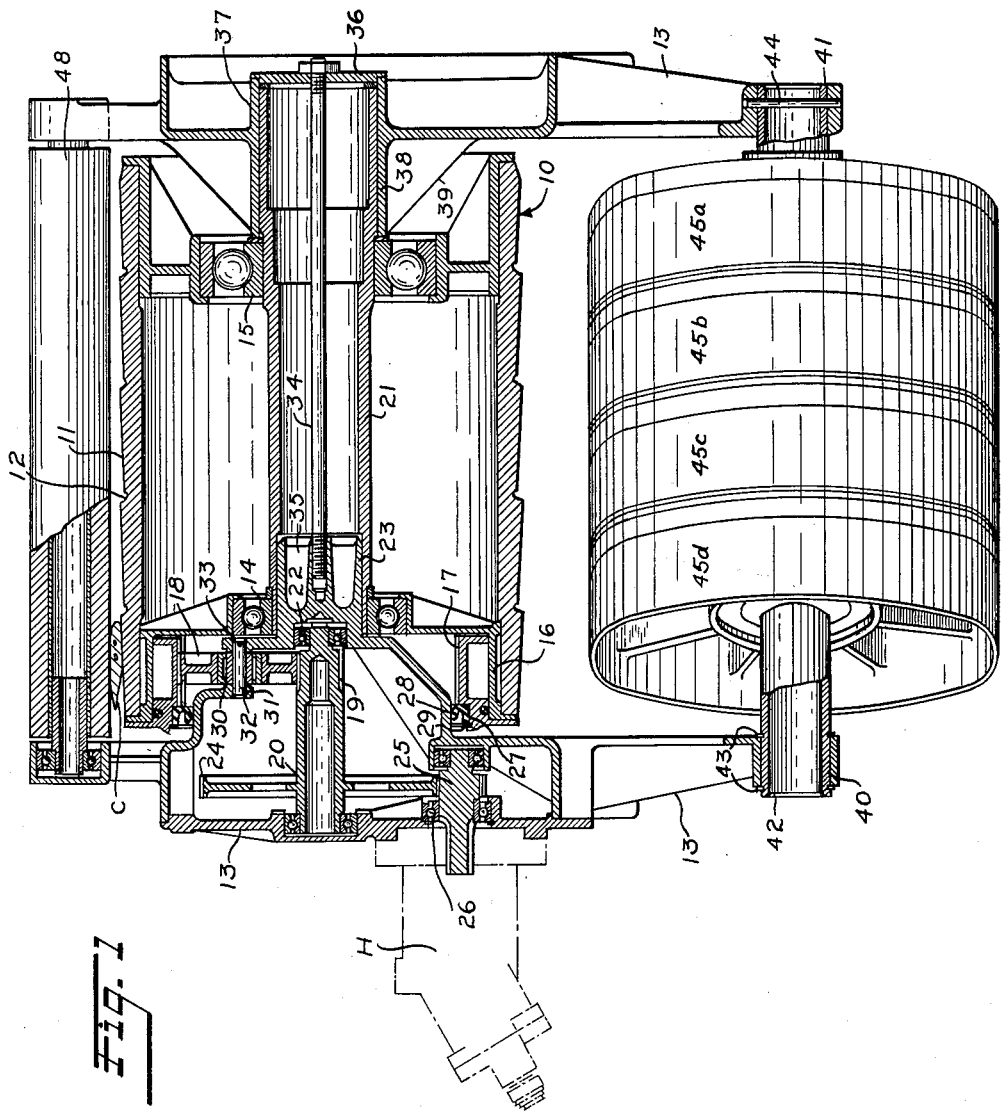
FIG. 1 is a sectional view of the cable drum as viewed on line 1—1 of FIG. 3 with an elevational view of the idler control pulleys.

With reference to the drawings and more particularly to FIG. 1, there is illustrated a cable drum 10 constructed preferably of aluminum because of its lightness in weight, the exterior periphery of which is suitably contoured to provide a series of crowned surfaces 11 the radius of which varies and which are axially spaced from each other by annular grooves 12, the purpose of which will become apparent as the specification progresses.

The cable drum 10 is removably supported on a hollow shaft 21 in a frame 13—13 by spaced bearings 14 and 15 with one extent of the drum being provided with an annular extension 16 which serves to support the internal ring element 17 of a conventional planetary gear arrangement. The planet 18 drives the drum 11 through internal ring gear 17, and the sun gear 19, which is integrally formed with shaft 20 has one end thereof carried by bearing 22 supported in one end of the hollow shaft 21. The outboard end of said shaft 20 is revolubly mounted in a bearing arranged in frame 13. Integral with said shaft 20 is an idler 24 arranged to be driven by drive pinion 25 suitably supported in bearings 26 also carried by the frame 13. There is best shown schematically in FIG. 1 a pump "H" arranged for driving pinion 25. As will be apparent to those skilled in the art, the pump H may be driven by any suitable means either electrically, mechanically, hydraulically or pneumatically. The internal ring gear 17 is provided with an undercut portion to secure a channel or annular recess 27 adapted to receive a sealing means 28 locked against axial displacement by a spring type snap ring 29. The seal 28 prevents access of foreign material into the planetary gear housing.

With further reference to the pinion 18, it will be observed that it is supported for rotation on a bearing indicated at 30 which is supported by a shaft 31 suitably positioned in apertures 32 and 33 provided in offstanding confronting elements carried by the framework 13.

Further, with regard to FIG. 1, it will be noted that the frame 13 is constructed of two separable elements which, as shown, are integrated into a single unit by an elongated rod 34 one end of which is threaded into engagement with an axially extending portion 35 integral with the telescoped sleeve 23. The opposite end of the rod 34 passes through and it suitably fastened to an annular plate 36 the perimeter of which abuts an offstanding collar 37. An inwardly extending coaxial sleeve portion 38 telescopes hollow shaft 21, the reinforcing web elements 39 serving to rigidify the perpendicular wall of the frame 13, all of which is best shown in FIG. 1.

The lower extremity of the elements comprising frame 13 are suitably apertured, as at 40 and 41, and adapted to receive a hollow shaft 42 which is locked against inadvertent lateral movement by any preferred means such as the split rings indicated at 43 or by a pin 44.

A better understanding of the invention will be had by referring at this point to FIG. 2 which is a bottom plan of the idler assembly, which comprises a plurality of parallel equally spaced control pulleys 45a, 45b, 45c and 45d, reading from right to left, supported for independent free rotation on the shaft 42 by spaced bearings 46. The bearings are supported by a bushing 47 the interior shaft engaging portion of which is canted at an appropriate angle to the axis of the shaft (substantially 15° is preferred) for a purpose now to be explained.

With further reference to FIG. 2, it will be noted that the periphery of each of the parallel spaced idler control pulleys, which are slightly crowned, is arranged at such an angle that the crowned portion of the perimeter of its upper edge intersects the plane of the cable drum near the right side, as viewed when looking into the sheet of drawings, whereas, because of the bearing and bushing construction the plane through which the lower portion of the corresponding pulley passes intersects an entirely different planal area of the cable drum. From a careful examination of FIG. 2, it will be observed that each of the parallel equally spaced idlers arranged as shown is stepped or eccentrically mounted relative to an adjacent idler. Also, clearly shown in this view, are a pair of rubber covered cable retainer rollers 48 suitably mounted for free rotation in bearings provided in opposed portions of the spaced frame members 13—13. In the lower right hand view of FIG. 2, a cable is shown in sectional view as it is being advanced into engagement with the power driven drum 10. The function of the rollers 48, in the organization, will be best understood by the following description of the operation which relates to controlling the ingress and egress of the faired cable to or from a conventional storage drum.

*Operation*

A faired tow-cable drive assembly, previously described and clearly illustrated in FIGS. 1, 2 and 3, includes a cable drive drum 10, preferably of aluminum, which has a series of crowned cable guide surfaces arranged equidistantly and in spaced parallel relation to each other and driven through a 42 to 1 gear reduction by the driving motor H. The four idlers, also supported in the frame 13, are equally spaced in spaced parallel arrangement and are each mounted at a substantially 15° angle to a plane perpendicular to the axis of the cable driver drum. The cable retaining rollers 48 are covered with thick resilient rubber and are supported at opposite sides of the cable driver drum with their axes in a plane passing therethrough as well as being perpendicular to the plane of the mounting frame 13. The space between the cable driver drum and the cable retaining rollers has been found to be preferably about ¼ inch.

During the operation of the cable driver drum to reel up the cable, the cable "C" is caused to enter upon the drum at the lower right hand side (see bottom plan view of FIG. 2) between the drum and retaining roller. Continuous rotation of the drum moves the cable 180° around the drum axis and under the second retaining roller 48 at the top of FIG. 2. At this time, the cable leaves the surface of the drum and is traversed toward the first of the cable direction control idlers 45a.

During the transfer from the idlers, 45a—45d, to the drum the center of the cable is coincident with a line that is tangent to the idler and drum and common to each of two planes perpendicular to the axes of the idler and drum and the cable is uniformly twisted through a substantially 15° angle from the time it leaves the drum until it arrives at an adjacent idler.

It will be apparent that since the drum 10 is power driven the cable drives the series of idlers. The 180° rotation of the cable about the idler axis brings the cable into alignment with the next position (45a) adjacent to the first one on the drum 10. During the transfer to the drum from the idler, the cable is again uniformly twisted to align itself with another surface. Following a second 180° rotation about the drum axis, the cable is aligned with the second idler (45b). It is believed that it will now be appreciated that as the reeling process is continued, the cable will gradually pass over all four idlers. Subsequently, upon leaving the last idler, the cable returns to a fifth position on the drum and thereupon it moves around the axis approximately 90°, thence leaves to be directed to a storage reel which may take the form of any suitable winding device forming no part of this invention.

Figure 4:
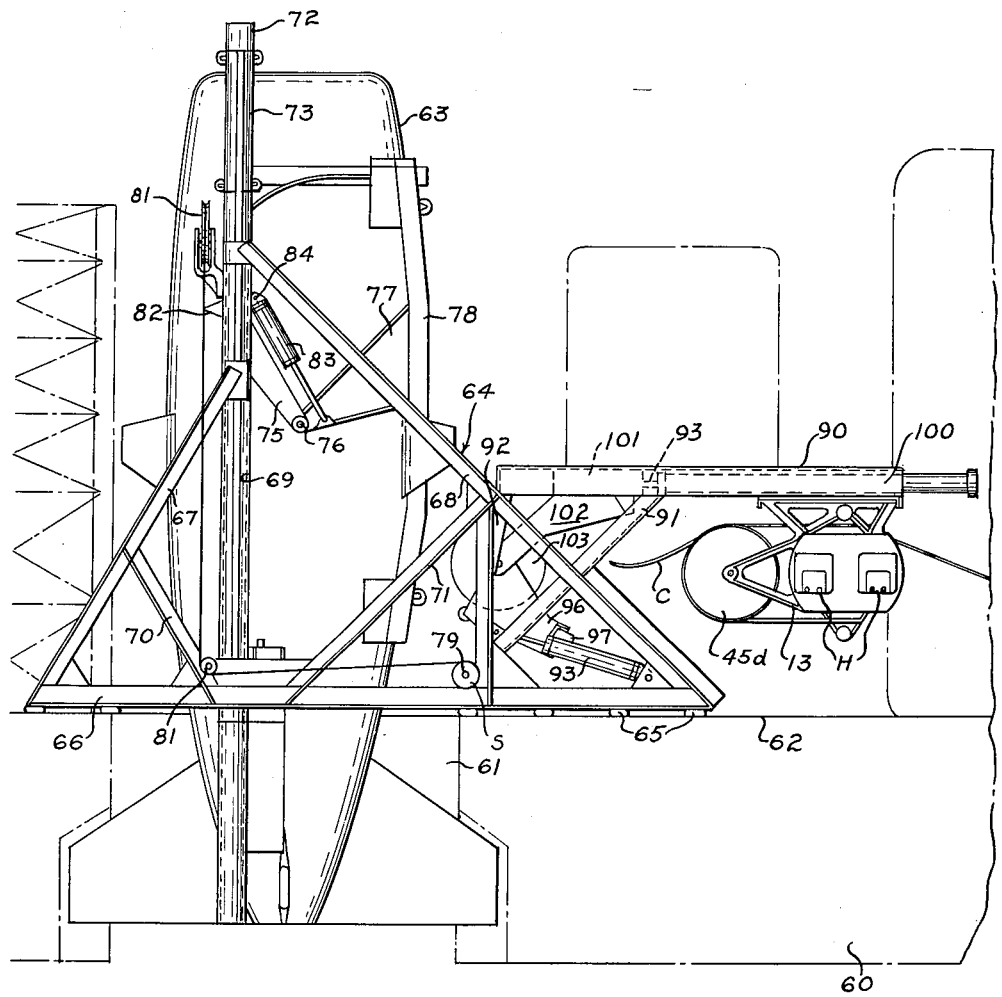
FIG. 4 is a schematic view transverse of the fuselage of the aircraft showing the sonar buoy in retracted position.

Having reference particularly to FIG. 4, there is shown in phantom outline a portion of an aircraft fuselage 60 which, for purposes of exemplification, will be considered to be that of a helicopter. The lower surface of said helicopter is provided with an opening, indicated generally at 61, which extends up through the floor 62 thereof, for a purpose now to be described. A handling structure for a sonar member 63 generally indicated at 64 is resiliently supported on the floor of the helicopter as by cushions 65. It will be observed from the top plan view in FIG. 5 that the handling structure straddles the opening 61 in the fuselage and comprises substantially duplicate structural elements that are suitably interconnected at the top and bottom. Fastened at opposite sides of the floor plate 66 are substantially converging struts 67 and 68, the ends of which are spaced, but in substantially perpendicular alignment and arranged to position a column which may comprise a tubular or rod-like member 69 (dotted outline FIG. 4) normal to the floor plate 66. A pair of suitable laterally extending angular means 70, welded between struts 67 and floor plate as well as a pair of angularly extending channels 71 welded between strut 68 and floor plate 66 are adapted to rigidify the supporting structure for handling of the sonar body. Of the aforesaid pairs of arms only one set is visible in FIG. 4, the others being hidden from view by the first pair.

Figure 6:
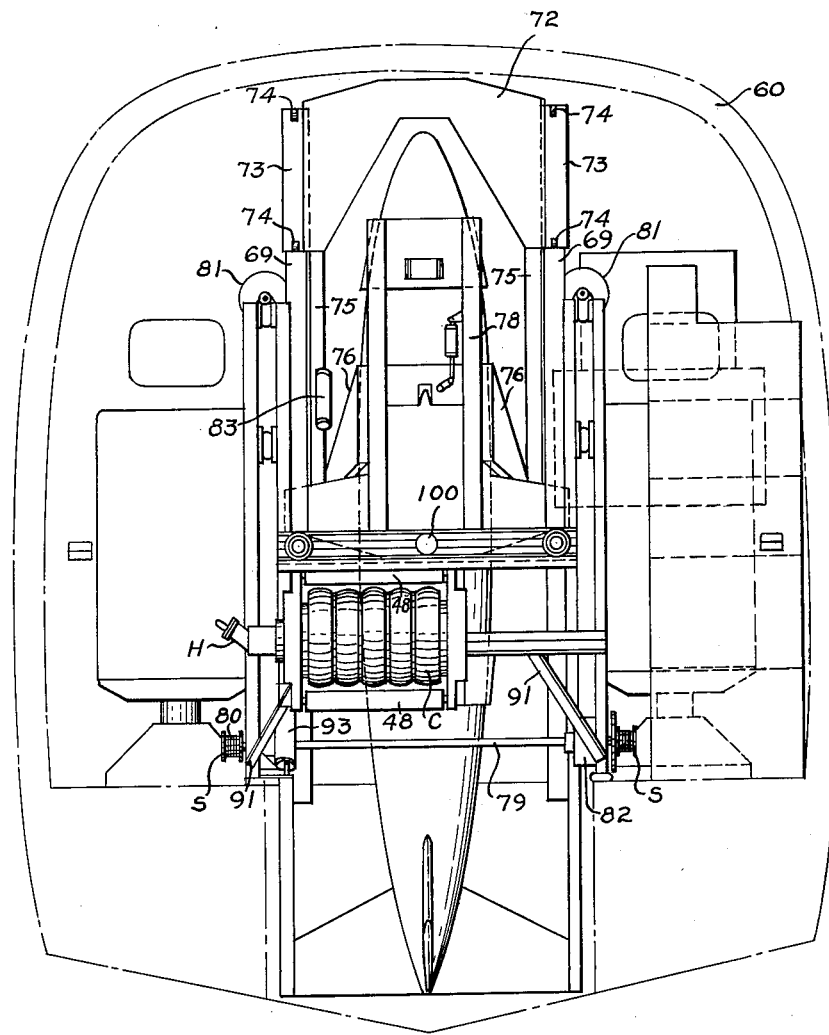
FIG. 6 is a schematic view longitudinally of the fuselage of the aircraft showing the sonar buoy in retracted position.

From an examination of FIG. 6 it will be noted that a saddle-like plate 72 has its opposite ends supported by split sleeves 73 with pairs of rollers 74—74 suitably supported therein and projecting through apertures in said sleeves for engagement with the rod-like member 69 that functions as a guide or trackway for the vertical movement of said saddle 72. Positioned parallel with and adjacent to said columns 69 are vertically movable depending arms 75—75 which are an integral part of said saddle 72. The lower extremity of said arms are curved rearwardly (FIGS. 7, 8 and 9) and pivotally attached at 76 to pairs of diverging webs 77, the opposite ends of which are integrated with the cradle 78 that supports the sonar member until it is launched into free flight from the aircraft. During flight of the aircraft, particularly when traveling with the sonar in raised position, as well as in take-off and landings thereof, the sonar member 63 is locked to the cradle 78 by means of latch L to prevent relative movement therebetween.

In FIG. 5, it will be noted that the horizontal shaft 79 projects beyond the opposite edges of the floor plate 66—66 and is provided at its ends with sheaves S—S about which cables 80—80 are suitably entrained. The sheaves are secured in any appropriate manner to the rigidified supporting structure for the sonar assembly and may be best seen in FIGS. 4, 5 and 6. The free ends of the cables pass from the sheaves over the vertically spaced pulleys indicated generally at 81—81 and are attached to brackets 82 which, in turn, are fastened to the sleeve 73 of the sonar lifting assembly.

When it becomes necessary to launch the sonar member for making necessary tests, a suitable motor, generally shown at 82 which is associated through sprocket gears with the shaft 79, is actuated through means not shown to start the descent of the sonar body relative to the opening in the aircraft shown at 61.

By now referring to FIG. 7, it will be noted that the sonar member 63 has been lowered beneath the craft. A power source 83 has its body pivotally secured at 84 to the curved arm 75 and the force exerting portion thereof pivotally associated with a web that is integral with the cradle 77 so that upon activation of said power source 83 the cradle 78 may be tilted about the pivot 76 (FIG. 7) to align it in a generally horizontal position preparatory to launching the sonar body into free flight.

Upon close examination of FIGS. 4 and 7, it will be observed that the cable drive assembly retracting frame 90 is pivotally supported upon shaft 79 by associated structure 91 and 92. Subsequent to the sonar member being lowered to the position shown in FIG. 7, the power source 93 (FIG. 4) is energized to swing the frame 90 into the vertical position illustrated in FIG. 7 so that the cable "C" may be played out from the reeling mechanism to permit the sonar member to be launched.

In FIG. 6, intermediate the retracting frame 90, there is shown an elongated power source 100 the reciprocating work arm 101 of which carries downwardly and forwardly projecting plates 102 between the spaced surfaces of which is rotatively positioned a pulley 103. As best shown in FIGS. 4 and 7, the cable "C" is led over the pulley 103 and thence about a spring-loaded arm 96 which is shown, in FIG. 7, retracted into an upwardly projecting position. When the sonar member is placed in readiness to be lowered from the craft and launched from the cradle 78, the power source 100 is actuated to lower the work arm 101 through the opening in the fuselage and the cable is thus played out. As this takes place, the weight of the sonar member and the cable thus overcome the spring-loaded arm 96 and it assumes the position shown in FIG. 8. The cable is fed out to the trailing sonar member between a pair of rollers 97.

Although but one embodiment of the invention has been depicted and described, it will be apparent that this embodiment is illustrative in nature and that a number of modifications in the apparatus and variations in its end use may be effected without departing from the spirit or scope of the invention as defined in the appended claims.

What I claim as new and desire to secure by Letters Patent of the United States is:

1. In an apparatus for hoisting cable having a cable drum and a plurality of parallel idler drums spacedly arranged therewith whereby the pass of said cable leaving said cable drum and passing around respective said idler drums is advanced from said respective idler drums in sequential spacing axially of the periphery of said cable drum, an improvement comprising a supporting shaft for said idler drums positioned parallel to the axis of rotation of said cable drum and bearing means rotatably connecting said idler drums to said supporting shaft at an acute angle thereto, the centroids of sections of said cable passing between said idler drums and said cable drum being substantially in parallel alignment with a plane passing through said axis of rotation of said cable drum and the longitudinal axis of said supporting shaft.

2. In a craft having superstructure for handling and storing a sonar member within said craft above an opening provided in said craft and apparatus for accumulating and storing cable, said cable having one end thereof connected to said apparatus and the other end thereof connected to said sonar member, the combination therewith comprising:
   (a) a cradle detachably connected to said sonar member;
   (b) means mounted on said superstructure and cooperating with said cradle to lower said cradle from said craft through said opening and thereby to suspend said sonar member beneath said craft; and
   (c) a cable hoisting assembly including a frame, a power operated cable drum positioned within said frame, a plurality of parallel idler drums revolubly supported by said frame on a shaft spaced from and mounted parallel to the axis of rotation of said cable drum with the axis of rotation of each said idler drum canted relative to said shaft whereby the pass of said cable leaving said cable drum and passing around adjacent said idler drums will be advanced from said idler drums to said cable drum in sequential spacing axially of the periphery of said cable drum, said cable hoisting assembly operable with said cable intermediate of the ends thereof.

3. The apparatus of claim 2 wherein the centroids of the sections of said cable passing between said cable drum and said idler drums are substantially parallel to a plane passing through said axis of rotation of said cable drum and said shaft.

4. The apparatus of claim 2 wherein said frame is pivotably mounted to said superstructure and including power means for positioning said frame perpendicularly relative to said opening with said cable extending from one of said idler drums through said opening to said sonar member when said sonar member is suspended beneath said craft and pulley means connected to said frame operable to be extended through said opening and to act against said cable intermediate of said one of said idler drums and said sonar member when said sonar member is so positioned.

5. The apparatus of claim 2 wherein said cable is a faired conductor cable.

6. A cable hoisting apparatus comprising:
   (a) a frame;
   (b) a cable drum rotatably mounted to said frame;
   (c) a shaft rigidly connected to said frame in parallel alignment with the axis of rotation of said cable drum; and
   (d) a plurality of parallel idler drums rotatably connected to said shaft with their axes of rotation skewed relative thereto, the diameter of each said idler drum being such that the distance between the center point on the periphery of said idler drum and the axis of said shaft is substantially equal to the radius of said cable drum.

7. The cable hoisting apparatus of claim 6 including additionally power means for rotating said cable drum.

8. An apparatus for hoisting cable comprising:
   (a) a frame;
   (b) a power operated cable drum positioned within said frame having its axis of rotation normal thereto;
   (c) a shaft mounted to said frame parallel to said axis of rotation of said cable drum; and
   (d) idler pulley means mounted on said shaft for advancing subsequent passes of a cable around said cable drum in spaced relation axially of said cable drum such that passes of said cable between said cable drum and said idler pulley means are substantially in parallel alignment with a plane passing through said axis of rotation of said cable drum and the longitudinal axis of said shaft.

9. The apparatus of claim 8 wherein said idler pulley means includes a plurality of parallel idler drums rotatably mounted on said shaft with their axes of rotation skewed at an angle of approximately 15° thereto.

References Cited in the file of this patent
UNITED STATES PATENTS

| 2,279,887 | Hathorn | Apr. 14, 1942 |
| 2,896,572 | Burke | July 28, 1959 |

FOREIGN PATENTS

| 219,101 | Australia | Nov. 14, 1958 |